Dec. 21, 1943.  T. G. MYERS ET AL  2,337,403
BEARING STRUCTURE
Filed Aug. 14, 1939  3 Sheets-Sheet 1
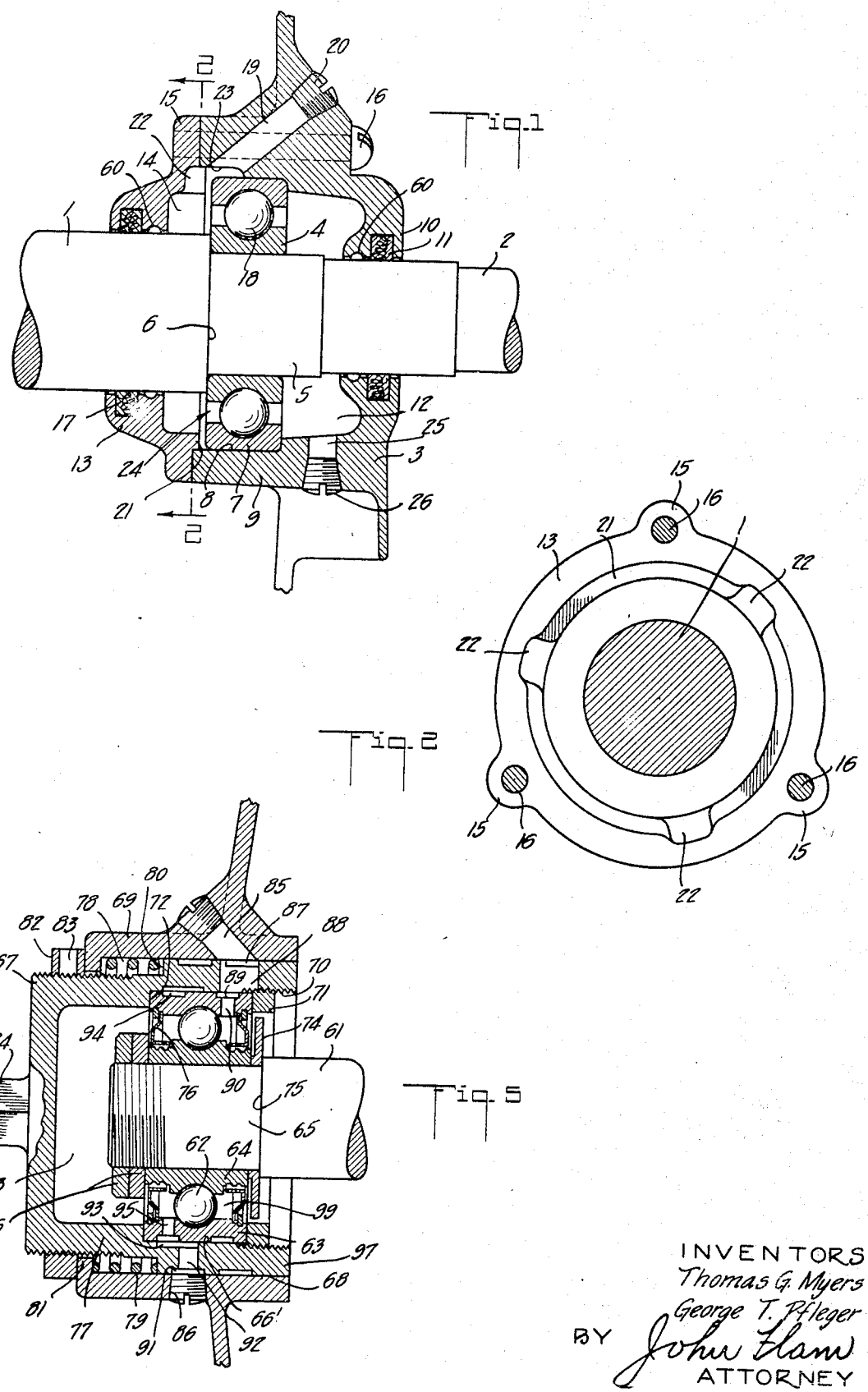
INVENTORS
Thomas G. Myers
George T. Pfleger
BY John Haw
ATTORNEY

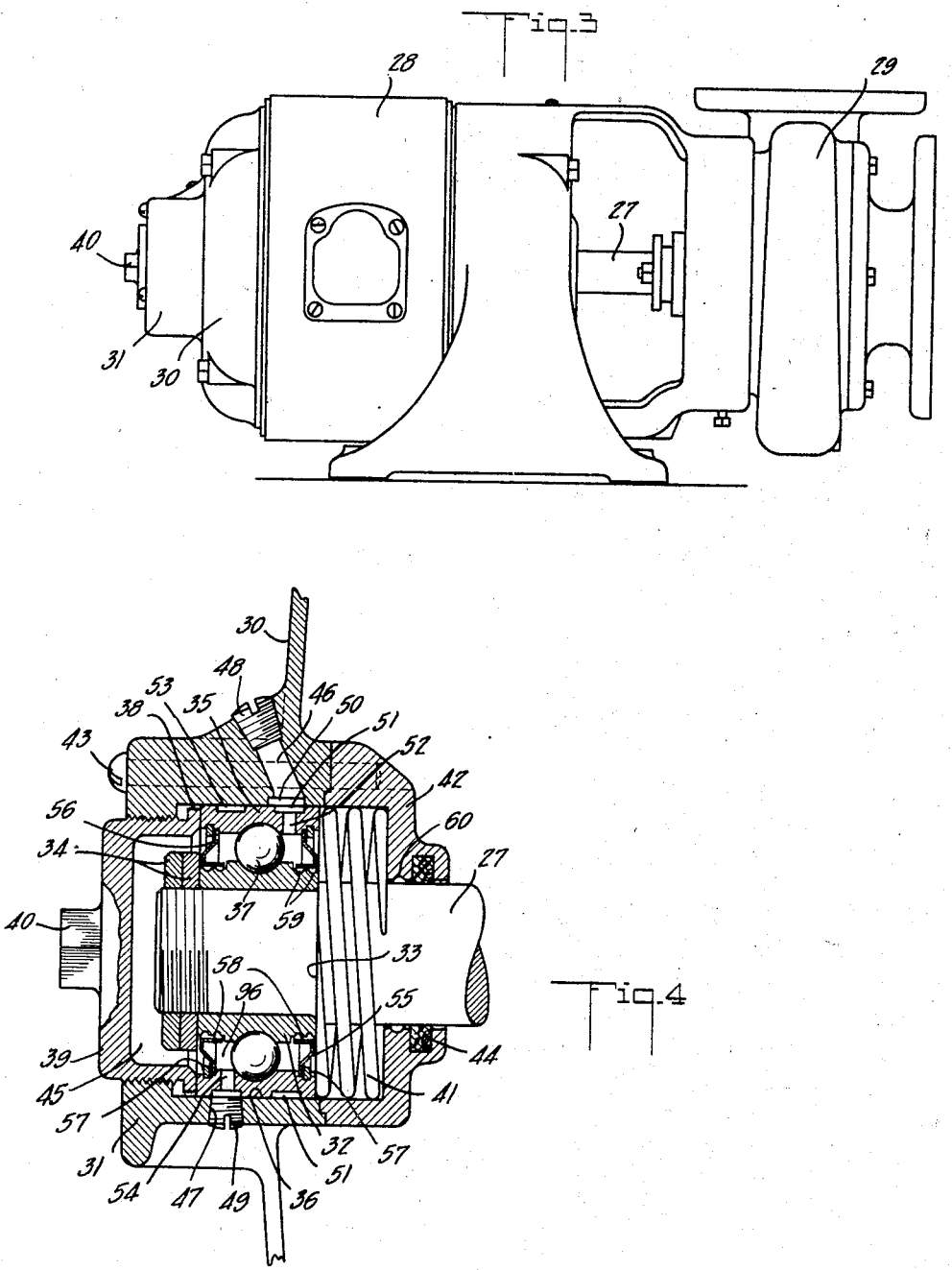

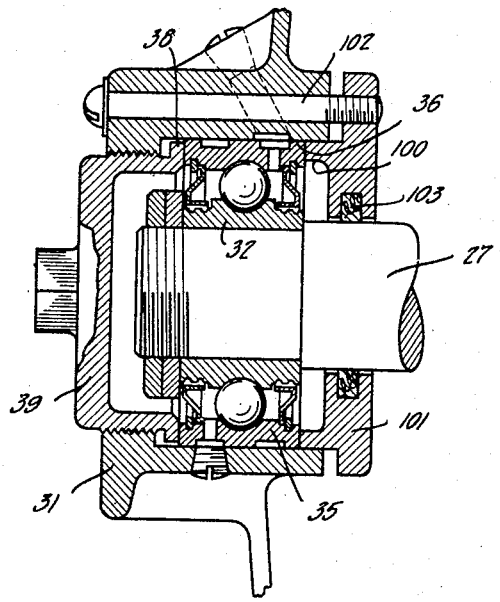
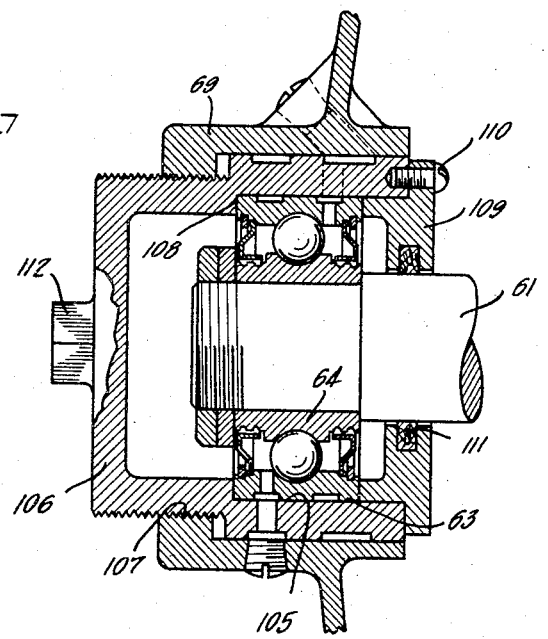

Patented Dec. 21, 1943

2,337,403

UNITED STATES PATENT OFFICE 2,337,403

BEARING STRUCTURE

Thomas G. Myers and George T. Pfleger, Los Angeles, Calif., assignors to U. S. Electrical Motors, Inc., Los Angeles, Calif., a corporation of California Application August 14, 1939, Serial No. 290,016

9 Claims. (Cl. 308—187)

This invention relates to anti-friction bearing structures, and particularly for such uses as motor bearings.

Usually such bearings are arranged to be packed with a heavy lubricant, such as grease. These bearing structures, although carefully designed to exclude dust or other harmful foreign matter, yet are subjected to such conditions of operation as to make it necessary to replace the grease packed into the bearing with a fresh supply. This renewal of lubricant is commonly provided by the aid of pressure, intended to force or blow out the old lubricant, and to inject the new lubricant. Often, however, no matter how great care may be exercised, a very substantial portion of the old lubricant is left, as for example in various recesses and in the spaces between the rolling elements of the bearings.

It is one of the objects of the invention to obviate the possibility of such occurrences, and to ensure that substantially all of the lubricant in the bearing structure may be removed in a convenient manner, without the necessity of disassembling the structure.

It is another object of this invention to improve in general, anti-friction bearings of the type hereinabove referred to.

In some installations, it is desirable to adjust the supported shaft in an axial direction, as for example to aline a rotary pump runner in the pump casing. It is another object of this invention to make it possible to make such adjustments, and yet to provide for convenient renewal of the lubricant.

This invention possesses many other advantages, and has other objects which may be made more easily apparent from a consideration of several embodiments of the invention. For this purpose there are shown a few forms in the drawings accompanying and forming part of the present specification. These forms, which illustrate the general principles of the invention, will now be described in detail; but it is to be understood that this detailed description is not to be taken in a limiting sense, since the scope of the invention is best defined by the appended claims.

Referring to the drawings:

Figure 1 is a sectional view of a bearing structure with its associated shaft, incorporating the invention;

Fig. 2 is a sectional view taken along plane 2—2 of Fig. 1;

Fig. 3 is an elevation of an electric motor and a pump in which another form of the invention is incorporated;

Fig. 4 is a sectional view, similar to Fig. 1, showing a modified form of the invention, adapted to be utilized in connection with the apparatus illustrated in Fig. 3.

Figs. 5, 6 and 7 are sectional views of further modifications of the bearing structure.

In the form of the invention illustrated in Figs. 1 and 2, a motor shaft 1 is indicated having a load driving extension 2. This shaft is shown as supported in a bearing standard 3 which may be formed as a bracket or the like supported on the main frame of a motor. This bracket supports a ball bearing structure 24. Thus the inner race 4 of the ball bearing structure is shown as accommodated on a reduced portion 5 of the shaft 1 and abutting the shoulder 6 of the shaft. The outer race 7 of the ball bearing structure 24 is shown as accommodated in the cylindrical bore 8 formed within the flange 9 of the standard 3.

Provisions are made for forming a lubricant housing or chamber that extends on both sides of the structure 24. Thus for example the standard 3 is provided with an end wall 10 through which the shaft extension 2 passes. A lubricant retaining washer 11, which may be of felt or the like, is accommodated in a circular groove concentric with the axis of the shaft 1, and engaging the outer periphery of the shaft. In this way a confined chamber 12 is formed to the right of the bearing structure 24.

On the inner side of the standard 3 a cap 13 is provided, to define the left hand portion 14 of the lubricant retaining chamber. This cap 13 may be provided with a plurality of ears 15 (Fig. 2) for accommodating the screws 16 for fastening the cap 13 to the inner surface of the standard 3. These screws 16 pass through appropriate apertures extending through the standard 3 and uniformly spaced around the axis of the shaft 1. The cap 13 may also be provided with a lubricant retaining washer 17 for confining the grease or other lubricant that may be passed into the chamber 12—14. The cap 13 is shown as being provided with a projecting flange 21 telescoping into the cylindrical surface 9 for accurately centering the cap 13 with respect to the axis of the shaft 1.

The standard 3 is provided with both inlet and outlet openings to pass grease or other lubricant into the chamber 12—14, as well as to pass the grease outwardly when it is desirable to renew the lubricant.

It is noted that the lubricant chamber surrounds the bearing structure 24 on both sides; and lubricant may pass between the rolling elements such as the balls 18.

The inlet aperture 19 is shown as slanting downwardly and inwardly from substantially the top portion of the structure. It may be closed by headless screw 20, which may be removed whenever it is desired to force lubricant by pressure through the opening 19. This opening 19 is in communication with the left hand portion 14 of the lubricant chamber. The inner edge of the cap 13 may form an obstruction to the passage of the lubricant into the space 14. In order to ensure that the lubricant can readily be forced into this space, the inner surface of cap 13 is shown as provided with recesses 22. In the present instance as many recesses 22 are shown as there are fastening screws 16, although but one of them cooperates with the opening 19. In this way irrespective of the particular angular relationship of the cap 13 with the standard 3, one or the other of the recesses 22 is inevitably positioned opposite the inlet opening 19.

Furthermore, in order further to assist the passage of the lubricant to the space 14, the bearing standard 3 is also provided with a recess 23. The cooperating recesses 22 and 23, as shown most clearly in Fig. 1, overlap the upper edge of the outer ball bearing race 7, permitting the grease when passed under pressure through the opening 19, to flow readily into the space 14.

On the opposite side of the bearing structure 24 and within the bearing standard 3 there is a lubricant outlet aperture 25. This lubricant outlet aperture is shown as being closed by headless screw 26.

When the bearing structure is first installed, heavy lubricant such as grease may be passed through the opening 19, the opening 25 being open so as to permit the air in the lubricant chamber to pass outwardly. After the chamber 12—14 is completely filled with lubricant, the headless screws 20 and 26 may be applied. In filling chamber 12—14 with lubricant, this lubricant is passed through the spaces between the rolling elements 18 and forms a lubricant packing for the bearing structure. If it should be desired thereafter to renew the lubricant after continued use, the headless screws 20 and 26 may be removed, and air pressure or new grease may be supplied through opening 19 to force or blow the old lubricant out through the aperture 21. The openings 19 and 25 being placed on opposite sides of the bearing structure 24, ensure that substantially every last vestige of the used lubricant is forced out. In this way it is assured that no appreciable amount of old lubricant is retained. If for example the apertures 19 and 25 were located on the same side of the bearing structure 24, it would be inevitable that some of the old grease or lubricant would be retained in the various narrow passages between the rolling elements 18.

Further, by forcing the lubricant through the bearing from one side to the other, any chips or flakes of metal which are sometimes formed by wear of the balls or races and may be present in the space between the races, are removed.

In case the old lubricant has been removed by air pressure in the manner described, new lubricant may be forced into the chamber 12—14, and the headless screws 20 and 26 may be replaced.

In the form of the invention illustrated in Figs. 3 and 4, provisions are also made for axial adjustment of the motor shaft 27. In this instance the motor 28 is shown as driving a pump runner in a pump casing 29. The motor 28 is provided with the end bracket 30, on which is formed a bearing standard 31. A similarly adjustable bearing structure may be provided adjacent the right hand end of the motor 28. The axial adjustment of the shaft 27 is provided so that the pump runner may be accurately centered within its housing.

Thus in the form of the invention, the antifriction bearing is provided with an inner race 32 abutting a shoulder 33 on the shaft 27. A plurality of nuts 34 are threaded on the end of the shaft 27 and abut the race 32 for holding the race in place. The outer race 35 has an external cylindrical surface adapted to slide within the cylindrical surface 36 formed on the inside of the bearing standard 31. The rolling elements such as the balls 37 are inserted between the two races.

The provisions for axially adjusting the position of the shaft 27 may now be described. This adjustment is provided by sliding the outer race 35 within the bearing standard 31. The left hand surface of the outer race 35 is arranged to abut a flange 38 formed integrally upon the inner edge of a member 39. This member 39 is threaded into a threaded end aperture of the standard 31. It is apparent that by rotating the member 39, as by the aid of the square projection 40, the axial position of the flange 38 is correspondingly adjusted. The outer race 35 is urged strongly against the flange 38 resiliently at all times, as by the aid of a compression spring 41. This compression spring surrounds the shaft 27 and engages the right hand surface of the race 35 to urge it toward the left. The compression spring 41 is confined by a cap 42 fastened as by a plurality of screws 43 to the bearing standard 31. This cap 42 may be provided as in the first form with a lubricant retaining washer 44.

Should it be desired to move the shaft 27 toward the right in an axial direction, the member 39 is threaded inwardly with respect to the bearing standard 31. When this takes place the outer race 35 is positively urged toward the right by the flange 38, and against the pressure of the spring 41.

Should it be desired to move the shaft 27 axially toward the left, the member 39 is retracted and the spring 41 is allowed to expand to keep the outer race 35 in contact with the flange 38.

Member 39 has an end wall which forms an enclosure 45 around the ball bearing structure.

Provisions are made as in the first form to pass lubricant into and out of a lubricant chamber and through the spaces between the balls 37. Furthermore, the inlet and outlet openings for the lubricant are located on opposite sides of these balls so as to obtain the advantages heretofore described; that is, the elimination of the used grease or lubricant without any appreciable amount being retained in the various narrow spaces.

Thus the bearing standard 31 is provided with a downwardly inclined lubricant inlet opening 46 arranged near the top of the bearing structure. A lubricant outlet opening 47 is formed near the lower portion of the bearing structure. Both of these openings may, as before, be closed as desired by the headless screws 48 and 49.

The lubricant chamber 96 is conveniently formed in this instance by the provision of lubricant retaining rings 55, 56, supported by the outer race 35. These retainers are placed on opposite sides of the balls 37. Each of these rings 55 and 56 includes a radial flange held in a groove in the outer race 35 as by the aid of the split spring rings 57. The retainers also have cylindrical portions 58 closely spaced from the outer surface of the inner race 32. Opposite the cylindrical portions 58 the inner race 32 may be provided with a plurality of shallow grooves 59. These grooves in cooperation with the cylindrical portions 58 restrict free passage of the lubricant from the chamber 96.

In order to ensure that the lubricant can pass into the chamber 96 for all axial positions of the shaft 27 and of the outer race 35, appropriate passageways are formed in the outer race 35 and in the bearing standard 31. Thus the bearing standard 31 is shown as having a slot 50 cooperating with the inner end of the opening 46. This slot 50 is in constant communication with an annular groove 51 formed on the outside of the race 35. Irrespective, therefore, of the relative circumferential position of the race 35 and the standard 31, lubricant can pass into this annular groove 51. Communicating with this annular groove 51 is a radial opening 52 which passes to the right hand side of the bearing structure, into the lubricant chamber 96. The width of the groove 51 and the length of the slot 50 are such that they remain in communication for either extreme adjustment of the axial position of the race 35.

The outlet opening 47 is likewise wide enough to stay in constant communication with another annular groove 53 formed on the outer surface of the race 35. Communicating with this groove 53 is a radial port 54 passing to the left hand side of the bearing structure, into the chamber 96. Thus again, when lubricant under pressure is passed through the inlet opening 46 it must pass through the intervening spaces between the balls 37 from the right hand side to the left hand side of the bearing structure. By virtue of the various grooves and apertures communication is maintained at all times between the inlet and outlet openings and the lubricant chamber 96.

In both the forms of Fig. 1 and Fig. 4, grooves such as 60 may be provided adjacent the lubricant retaining washers 11, 17 and 44, further to obstruct leakage of lubricant past these washers.

In the form of the invention illustrated in Fig. 4, the compression spring 41 is located within the cap 42, and serves to urge the shaft 27 toward the left. This arrangement however is not essential. For example in the form of Fig. 5, a structure is indicated in which a resilient compression spring is utilized to urge the shaft 61 toward the right.

In this instance the anti-friction bearing structure includes the ball bearings 62 located between the outer race 63 and the inner race 64. The inner race is held on the reduced portion 65 of the shaft 61 as by the aid of a plurality of nuts 66.

The outer race 63 in this instance is firmly held within a cylindrical recess 66' formed in an axially movable member 67. This axially movable member 67 has an outer cylindrical surface 68 slidable within the bearing standard 69. The open right hand end 97 of the member 67 has internal threads 70 in which a retaining ring 71 is threaded to abut the right hand surface of the outer race 63. The left hand surface of the outer race 63 is thereby held in contact with the shoulder 72 formed on the inside of the member 67.

To retard lubricant from passing out of the space 73 formed by member 67, the shaft 61 may carry a ring 74, located between the shoulder 75 on the shaft 61 and the right hand surface of the inner race 64.

As before, retainer rings 76 are supported on the outer race 63, to define a lubricant chamber 99.

The member 67 is slidable axially within the standard 69. Its reduced portion 77 provides an annular space 78 in which is located a compression spring 79. This compression spring acts against the flange 80 formed on the member 67, to urge this member toward the right. The left hand end of the spring 79 abuts the end flange 81 of the standard 69.

In order to adjust the axial position of the shaft 61 in this form of the invention, use is made of a nut 82, threaded on the left hand reduced portion of the member 67, projecting out of standard 69. This nut may be engaged by a spanner wrench, as by the aid of the radial apertures 83 formed in the nut 82. The right hand surface of the nut 82 is urged into abutting relation with the end surface of the flange 77 by the force of the spring 79. By rotating the nut 82, the axial position of the member 67 is correspondingly adjusted. This rotation may be effected while holding member 67 stationary, as by the aid of the square projection 84.

The passage of the lubricant such as grease into and out of the space 99 surrounding the balls 62 is accomplished in a manner quite similar to that illustrated in Fig. 4. Thus an inlet opening 85 is provided in the standard 69, and an outlet opening 86 is also provided in the bottom portion of the structure. The inlet opening 85 is in constant communication with an annular groove 87 formed on the outer periphery of the member 67. A radial aperture 88 extends through the member 67. This aperture is in communication with the annular groove 89 on the exterior surface of the outer race 63. A radial opening 90 leads from the groove 89 to the space 99, and to the right of the balls 62. By making the annular grooves 87 and 89 sufficiently long, the inlet opening 85 is in constant communication with the right hand portion of the lubricant chamber irrespective of the axial position of the shaft 61.

The outlet opening 86 is shown as in communication with a similar annular groove 91 on the exterior periphery of the member 67. A radial aperture 92 extends through the member 67 and in communication with an internal groove 93 in the member 67. This groove 93 is in constant communication with an external groove 94 on the outer periphery of the outer race 63. Radial aperture 95 through the outer race 63 places these grooves in communication with the left hand portion of the lubricant chamber 99. As before, the grooves 91, 93 and 94 are of sufficient extent to ensure constant communication from the outlet opening 86 to the lubricant chamber irrespective of the axial position of the shaft 61.

In the forms of the invention illustrated in Figs. 4 and 5, the active portion of the lubricant chamber is defined by the lubricant retainers 55, 56 and 76. It is not essential in this form that all of the space within the adjustable elements 39 and 67 be filled with the lubricant; only the chamber 96 or 99 immediately surrounding the ball bearings 37 and 62, need be packed. The space within member 39 or 67, encompassing the inner chamber 96 or 99, may serve conveniently to collect excess lubricant.

Referring to the assembly of Fig. 3 which shows the motor direct connected to a centrifugal pump, such pumps as commonly made have a thrust exerted on the shaft by the pump runner tending to move the shaft axially. The direction of this thrust depends on the design of the pump. Thus, the arrangement shown in Fig. 4 is the preferred form when this thrust tends to move the shaft toward the left. If this form was used when the thrust urged the shaft toward the right, it would be necessary to have spring 41, sufficiently strong to hold the shaft against movement due to this thrust. Otherwise, the shaft and pump impeller would move to the right, causing the pump impeller to get out of adjustment. By restricting this form of the invention to use when the thrust is toward the left, the need for a heavy spring is obviated.

If the thrust is such as tends to move the shaft to the right, then the arrangement shown in Fig. 5 is the preferred form, as a positive stop is provided against movement of the shaft to the right. Movement in the opposite direction, however, is prevented only by a spring, 79, as before.

Figs. 6 and 7 illustrate further modifications of the invention in which the axial position of the shaft may be adjusted and in which the adjustment is positively maintained against thrust in either direction.

The general structure of the form shown in Fig. 6 is similar to that shown in Fig. 4. Thus, shaft 27 has the inner race 32 of an anti-friction bearing secured thereon, the outer race 35 of the bearing being slidable within the cylindrical surface 36 formed on the bearing standard 31. An adjusting member 39 threadedly engages an end aperture in the standard 31 and carries a flange 38 arranged to abut the left hand surface of the outer race 35, all as before. In this form however outer race 35 is urged by flange 38 against the lip 100 of a cap 101, adjustably secured to the bearing standard 31 at the inside end of the cylindrical surface 36 by several screws, one of which is shown at 102.

It will be apparent that by suitably rotating member 39, flange 38 will be caused to clamp race 35 against lip 100 of cap 101. This holds the bearing as well as shaft 27 against movement in an axial direction, cap 100 serving to prevent movement to the right, member 39 serving to prevent movement to the left. If it is desired to move shaft 27 to the right, screws 102 are adjusted to move cap 101 to the right, and member 39 is manipulated to clamp race 35 against lip 100. If it is desired to move shaft 27 to the left, member 39 is adjusted to move flange 38 to the left, and screws 102 are then manipulated to move cap 101 to the left to bring lip 100 against race 35. At all times race 35 is clamped between member 39 and cap 101. The provisions for greasing the bearing are the same as those in Fig. 4. Cap 101 may be provided with a lubricant retainer such as felt washer 103, if desired.

Fig. 7 shows a modification of Fig. 5, wherein the bearing is positively secured in adjusted position against movement in either direction. The shaft 61 carries the inner race 64 of an anti-friction bearing, the outer race 63 of which is clamped within a cylindrical recess 105 formed in an axially adjustable member or bearing cage 106. Member 106 is exteriorly threaded, so as to be adjustably secured in the threaded bore 107 of the outside wall of the bearing standard 69. A shoulder 108 is formed on the inside of cage 106, and a cap 109 secured to the open end of cage 106 as by screws 110, is arranged to clamp the outer race 63 against the shoulder 108. The cap 109 is shown as having a felt washer 111 to prevent leakage of grease along shaft 61.

The arrangement is such that the bearing 63—64 and shaft 61 are held against axial movement with respect to cage 106, and further, due to the threaded engagement between cage 106 and bearing standard 69, against axial movement relative to the bearing standard.

However, the axial position of the shaft 61, may be adjusted by rotating cage 106 in the bearing standard 69 by means of the square extension 112. Provisions for greasing the bearing are the same as in the form of Fig. 5.

What is claimed is:

1. In a device of the character described, an anti-friction bearing structure having an inner and an outer race as well as rolling elements between the races, a standard for supporting the bearing structure, said outer race being axially movable within said standard, and means forming a lubricant chamber extending on both sides of the bearing structure, said standard having inlet and outlet openings communicating with the chamber and on opposite sides of the bearing structure, said outer race having passages respectively connecting the openings with the chamber for all adjusted positions of said outer race.

2. In a device of the character described, an anti-friction bearing structure having an inner and an outer race as well as rolling elements between the races, a standard for supporting the bearing structure, said outer race having a sliding fit within the standard, means adjustable on the standard for defining a limiting abutment for the outer race, resilient means for urging the outer race against said abutment, and means defining a lubricant chamber enclosing the rolling elements, said standard having openings connecting with the chamber for all adjusted positions of said outer race respectively on opposite sides of the rolling elements.

3. In a device of the character described, an anti-friction bearing structure having an inner and an outer race as well as rolling elements between the races, a standard for supporting the bearing structure, said outer race having a sliding fit within the standard, means adjustable on the standard for defining a limiting abutment for the outer race, resilient means for urging the outer race against said abutment, and means defining a lubricant chamber enclosing the rolling elements, said standard having openings connecting with the chamber respectively on opposite sides of the rolling elements, said outer race having passages in continuous communication with said openings to form ports for the passing of lubricant in and out of the chamber.

4. In a device of the character described, an anti-friction bearing structure having an inner and an outer race as well as rolling elements between the races, a standard for supporting the bearing structure, a member axially slidable within the standard and carrying the outer race, said member having an extension out of the standard and providing an abutment limiting inward travel of the member with respect to the standard, and a spring coiled around the member and within the standard for urging said member inwardly.

5. In a device of the character described, an anti-friction bearing structure having an inner and an outer race as well as rolling elements between the races, a standard for supporting the bearing structure, a member axially slidable within the standard and carrying the outer race, said member having an extension out of the standard and providing an abutment limiting inward travel of the member with respect to the standard, and a spring coiled around the member and within the standard for urging said member inwardly, means defining a lubricant chamber that extends on both sides of the rolling bearing elements, the standard having inlet and outlet openings for lubricant, the outer race and the member having ports for the passage of lubricant through said openings in any adjusted position of the bearing structure.

6. In a device of the character described, an anti-friction bearing structure having an inner and an outer race as well as rolling elements between the races, a standard for supporting the bearing structure, a member axially slidable within the standard and carrying the outer race, said member having an extension out of the standard and providing an abutment limiting inward travel of the member with respect to the standard, and a spring coiled around the member and within the standard for urging said member inwardly, means defining a lubricant chamber that extends on both sides of the rolling bearing elements, the standard having inlet and outlet openings for lubricant, the outer race and the member having ports for the passage of lubricant through said openings in any adjusted position of the bearing structure, said ports being so arranged that the inlet and outlet openings are in communication with the chamber respectively on opposite sides of the bearing structure.

7. In an adjustably mounted bearing structure, a standard for supporting the bearing structure, said bearing structure being of the anti-friction type and including inner and outer races as well as rolling elements between the races, said standard having a cavity open at both ends, a cap forming a closure for one end of the cavity and supported by the standard, means for adjusting the axial position of the cap on the standard, said means including relatively adjustable stops on the cap and the standard and a resilient member for urging said stops into engagement, the outer race of the bearing structure being supported by the cap, a shaft secured to the inner race and extending from the opposite end of the cavity, a shoulder on the cap, and means for maintaining the outer race against the shoulder, whereby the axial position of the bearing as well as of the shaft is determined by the axial position of the cap.

8. In a device of the character described, a bearing structure of the anti-friction type and capable of supporting a thrust as well as a radial load, said structure having an inner race and an outer race, a shaft carried by the inner race, a standard having a through aperture, said outer race being supported for axial adjustment within the aperture, resilient means confined in said aperture for urging the outer race in one direction, and means cooperating with the standard on the same side of the bearing structure as the resilient means for limiting the movement of the outer race in response to said resilient means, said limiting means being axially adjustable with respect to the bearing structure.

9. In a device of the character described, an inner race adapted to be carried by a shaft, an outer race, said races defining an annular space, and rolling elements in said space, said outer race extending in an axial direction with respect to the races, so as to project beyond the rolling elements, said outer race having an aperture communicating with the space on one side of the elements, as well as a circumferentially displaced aperture communicating with the space on the other side of the elements, said outer race being also provided with a pair of spaced annular exterior grooves, respectively communicating with said apertures.

THOMAS G. MYERS.
GEORGE T. PFLEGER.